United States Patent Office 3,354,234
Patented Nov. 21, 1967

3,354,234
REACTION OF AN OLEFIN WITH HCl OR HBr AND OXYGEN
Percy Hayden and Charles Fox, Norton-on-Tees, England, assignors to Imperial Chemical Industries Limited, London, England, a corporation of Great Britain
No Drawing. Continuation of application Ser. No. 287,191, June 12, 1963. This application May 25, 1966, Ser. No. 552,982
Claims priority, application Great Britain, June 15, 1962, 23,106/62
6 Claims. (Cl. 260—656)

This application is a continuation of application Ser. No. 287,191, filed June 12, 1963, now abandoned.

This invention relates to the manufacture of halogenated hydrocarbons.

According to the present invention there is provided a process for the manufacture of halogenated hydrocarbons which comprises the step of contacting a gaseous mixture comprising an olefine, a hydrogen halide and a source of elemental oxygen with a supported catalyst at elevated temperature, the catalyst being comprised of a compound of a platinum-group metal, as hereinafter defined.

By the term "a compound of a platinum-group metal" is meant a compound of one of the metals platinum, palladium, rhodium, ruthenium, osmium and iridium. Preferably a compound of platinum is employed. It is also desirable to incorporate in the catalyst a compound of a metal of variable valency, preferably a halide corresponding to the halogenated hydrocarbon produced. Thus in the production of vinyl chloride, the catalyst suitably also contains copper chloride. The incorporation of other compounds than copper into the catalyst, for example, halides of Groups I and II of the Periodic System can also be beneficial.

The supported catalyst may be diluted with further quantities of untreated support material or may be diluted with other materials such as graphite particles which assist in controlling the heat of the reaction. Again a graded bed may be used, that is, a bed in which the ratio of untreated support or graphite particles is greatest at the inlet end of the bed and is diminished from the inlet end to the outlet end of the bed.

The present process is particularly applicable to the manufacture of chlorinated and brominated hydrocarbons. The olefines which may be employed include, for example, ethylene, propylene, straight and branched-chain olefines containing four or more carbon atoms, cyclic olefines such as cyclohexene, and olefines containing aryl groups such as styrene.

Temperatures in the range 200° C. to 600° C. are generally employed although the particular temperature range employed depends essentially on the particular olefine reactant employed. For example in the manufacture of vinyl chloride from ethylene temperatures in the range 200° C. to 500° C., preferably 300° C. to 450° C. are employed.

A suitable source of elemental oxygen is air and the reaction is also preferably carried out in the presence of a gaseous diluent which may be nitrogen, or excess ethylene or excess hydrogen chloride. In order to prevent the reaction occurring with explosive violence the concentration of oxygen is kept below 10%, for example, approximately 6% by volume of the total feed.

In carrying out the present process, by-product formation occurs to some extent. Thus, when using ethylene as the starting material, halides other than vinyl chloride are formed. These include ethyl chloride, 1:1-dichloroethylene, 1:1-dichloroethane and 1:2-dichloroethane.

The halogen-substituted olefines produced by the present invention may be used for the production of polymers—for example, vinyl chloride may be used for the formation of polyvinyl chloride—and as intermediate in the production of other organic compounds.

The following examples illustrate but do not limit the invention.

*Example 1*

16.9 g. $CuCl_2$ was dissolved in 65 ml. water and to this solution was added 2.1 g. $PdCl_2$ in 10 ml. of water and 10 ml. concentrated HCl. The combined solution was added to 100 g. silica gel contained in an evaporating dish, the silica being stirred with a glass rod. The silica gel was of particle size 10–18 mesh B.S.S. (the aperture between the wires being between 1.68 mm. to 0.85 mm.). The impregnated silica gel was dried by heating for 18 hours at 120° C. The catalyst contained 1% by weight Pd and 5% by weight Cu.

Utilising a catalyst tester unit 3 cc. of the catalyst were diluted with 30 cc. of glass particles of the same size as the silica and were placed in a "Pyrex" tube ("Pyrex" is a registered trademark) ¾ inch internal diameter, equipped with a central thermocouple pocket, ¼ inch external diameter. The reactor was maintained at a temperature of about 350° C. and a gas mixture consisting of ethylene, air, hydrogen chloride and nitrogen was passed over the heated catalyst. The gas stream analysed 0.04% by volume vinyl chloride, 0.3% by volume 1:2-dichloroethane and 0.10% by volume carbon monoxide and carbon dioxide.

*Example 2*

A catalyst was prepared by dissolving 16.9 g. $CuCl_2 2H_2O$ in 23 ml. water. To this solution was added a solution of 3.1 g. of a chloroplatinic acid (containing 40% Pt by weight) in 15 ml. water. The combined solution was added to 100 g. of an activated alumina known under the trade name "Actal A" which was placed in an evaporating dish and the mixture was stirred with a glass rod. The impregnated alumina was then dried by heating for 18 hours at 120° C. The supported catalyst thus contained 5% by weight Cu, 1% by weight Pt.

The particle size of the supported catalyst was 10–18 mesh (B.S.S., the aperture between the wires being between 1.68 mm. to 0.85 mm.).

Utilising a catalyst tester unit 1 ml. of the catalyst was diluted with 30 ml. of glass particles of the same size as the alumina. The mixture was placed in a "Pyrex" tube, ("Pyrex" is a registered trademark) ¾ inch internal diameter, equipped with a central thermocouple pocket ¼ inch external diameter. The reactor was maintained at a temperature of about 350° C. and a gas mixture consisting of 2.5 l./hr. anhydrous HCl, 1 l./hr. oxygen and 8.5 l./hr. nitrogen was passed over the heated catalyst. After about an hour when static conditions had been established, the gas stream was analysed and found to contain:

| | Percent by volume |
|---|---|
| $CH_2=CHCl$ | 1.7 |
| $CH_2Cl.CH_2Cl$ | 2.1 |
| CO | 0.2 |
| $CO_2$ | 0.3 |
| $O_2$ | 4.2 |
| HCl | 24.6 |
| $C_2H_4$ | 11.3 |
| $N_2$ | 51.8 |
| $H_2O$ | 3.8 |

What we claim is:
1. A process for the manufacture of a monohalogenated olefine selected from the group consisting of monochlorinated olefines and monobrominated olefines which comprises providing a gaseous mixture consisting essen- tially of an olefine, hydrogen halide selected from the group consisting of hydrogen chloride and hydrogen bromide, and a source of elemental oxygen, wherein the oxygen content of said gaseous mixture is less than 10% by volume, and contacting said mixture with a supported catalyst at a temperature between 200° C. and 600° C., the catalyst consisting essentially of a halide of a platinum-group metal and a halide of copper wherein the catalytic halides employed are those corresponding to the halogenated hydrocarbon produced.

2. A process as claimed in claim 1 in which the halide of a platinum-group metal is a halide of palladium.

3. A process as claimed in claim 1 in which the halide of a platinum-group metal is a halide of platinum.

4. A process as claimed in claim 1 in which a copper chloride is incorporated in the catalyst.

5. A process as claimed in claim 1 in which the olefine reactant is ethylene and in which the reaction temperature is in the range 300° C. to 450° C.

6. A process according to claim 1 for the manufacture of vinyl chloride which comprises contacting a gaseous mixture consisting essentially of ethylene, hydrogen chloride, and a source of elemental oxygen, wherein the oxygen content of said mixture is less than 10% by volume with a supported catalyst at a reaction temperature in the range of 200° C. to 500° C., said catalyst consisting essentially of a mixture of platinum chloride and copper chloride.

References Cited

UNITED STATES PATENTS

| 2,308,489 | 1/1943 | Cass | 260—656 |
| 2,838,577 | 6/1958 | Cook et al. | 260—656 |
| 2,866,830 | 12/1958 | Dunn et al. | 260—659 |
| 3,184,515 | 5/1965 | Penner et al. | 260—659 X |

FOREIGN PATENTS

| 167,846 | 11/1953 | Australia. |
| 517,009 | 9/1955 | Canada. |
| 1,143,807 | 2/1963 | Germany. |

BERNARD HELFIN, *Acting Primary Examiner.*

LEON ZITVER, *Examiner.*

K. V. ROCKEY, T. G. DILLAHUNTY,
*Assistant Examiners.*